(12) United States Patent
Lewis

(10) Patent No.: US 12,003,394 B1
(45) Date of Patent: Jun. 4, 2024

(54) CELL SITE ROUTER COMPREHENSIVE HEALTH CHECK

(71) Applicant: DISH Wireless L.L.C., Englewood, CO (US)

(72) Inventor: Jeremy Lewis, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/172,813

(22) Filed: Feb. 22, 2023

(51) Int. Cl.
*G06F 15/173* (2006.01)
*H04L 41/0631* (2022.01)
*H04L 43/0817* (2022.01)

(52) U.S. Cl.
CPC ...... *H04L 43/0817* (2013.01); *H04L 41/0631* (2013.01)

(58) Field of Classification Search
CPC .............. H04L 43/0817; H04L 41/0631
USPC .................................................. 709/223, 224
See application file for complete search history.

(56) References Cited

U.S. PATENT DOCUMENTS

| | | | |
|---|---|---|---|
| 11,675,946 B1* | 6/2023 | Waters | H04L 69/22 703/23 |
| 2006/0015604 A1* | 1/2006 | Mollitor | G06Q 10/10 709/223 |
| 2013/0121207 A1* | 5/2013 | Parker | G06Q 30/06 370/254 |
| 2014/0199180 A1* | 7/2014 | Schoendorff | F04B 51/00 417/63 |
| 2018/0054363 A1* | 2/2018 | Ngampornsukswadi | H04L 67/1001 |
| 2021/0243104 A1* | 8/2021 | Parmer | H04L 41/0869 |

FOREIGN PATENT DOCUMENTS

EP 2522974 A2 * 11/2012 ............. G01D 18/00

* cited by examiner

*Primary Examiner* — Liang Che A Wang
(74) *Attorney, Agent, or Firm* — Capitol City TechLaw; Jasbir Singh

(57) ABSTRACT

A system and method for performing a health check for a cell site, the method including: accessing a Cell Site Router (CSR) including vital interfaces at a cell site; gathering a respective value for each of the vital interfaces at the CSR; and generating a health report of the cell site based on gathered values. The vital interfaces include one or more network ports and one or more radio unit interfaces, and the CSR is disposed at a base station.

12 Claims, 5 Drawing Sheets

| Site ID | Interface | Description | Port Status 402 | Admin State | LED | Laser Bias (mA) | Tx Power (dBm) | Rx Power (dBm) | Tx Power (mW) | Rx Power (mW) | TRX Temp (°C) | TRX Voltage (V) | TRX Type | MAC Address | IP Address | Device Type |
|---|---|---|---|---|---|---|---|---|---|---|---|---|---|---|---|---|
| SiteBossX | Gi0/0/0/0 | SiteBoss | Up | In Service | N/A | N/A | N/A | N/A | N/A | N/A | N/A | N/A | SFP-1G-1000BASE_T | MAC_Addr | IP_Addr | Asentria SiteBoss |
| CSRX | Gi0/0/0/2 | BMC | Up | In Service | N/A | N/A | N/A | N/A | N/A | N/A | N/A | N/A | SFP-1G-1000BASE_T | MAC_Addr | IP_Addr | DELL XR11 |
| | Gi0/0/0/3 | SM BMC ESXi | Down | In Service | N/A | N/A | N/A | N/A | N/A | N/A | N/A | N/A | SFP-1G-1000BASE_T | | | |
| Alpha TMB | Te0/0/0/4 | RU1 | Up | In Service | Green | 32.4 | -2.49 | -0.65 | 0.5609 | 0.7109 | 30 | 3.257 | SFP+-10G-LR | MAC_Addr | IP_Addr | |
| Alpha DMB | Te0/0/0/5 | RU2 | Up | In Service | Green | 29.5 | -2.51 | -1.88 | 0.5585 | 0.7272 | 28 | 3.257 | SFP+-10G-LR | MAC_Addr | IP_Addr | |
| Beta TMB | Te0/0/0/6 | RU3 | Up | In Service | Green | 32.3 | -2.52 | -1.15 | 0.5624 | 0.6995 | 31 | 3.319 | SFP+-10G-LR | MAC_Addr | IP_Addr | |
| Beta DMB | Te0/0/0/7 | RU4 | Up | In Service | Green | 30.1 | -2.49 | -1.54 | 0.5589 | 0.7663 | 29 | 3.272 | SFP+-10G-LR | MAC_Addr | IP_Addr | |
| Gamma TMB | Te0/0/0/8 | RU5 | Up | In Service | Green | 27.2 | -2.52 | -1.38 | 0.5618 | 0.6457 | 30 | 3.245 | SFP+-10G-LR | MAC_Addr | IP_Addr | |
| Gamma DMB | Te0/0/0/9 | RU6 | Up | In Service | Green | 39 | -2.51 | -1.49 | 0.5628 | 0.8592 | 29 | 3.281 | SFP+-10G-LR | MAC_Addr | IP_Addr | |
| | Te0/0/0/13 | DU PTP | Up | In Service | Green | 0 | 0 | 0 | N/A | N/A | N/A | N/A | SFP+-10G-CR | | | /\/\ |
| | Te0/0/0/14 | VMware MGMT | Up | In Service | Green | 0 | 0 | 0 | N/A | N/A | N/A | N/A | SFP+-10G-CR | | | (^_^=) |
| | Te0/0/0/15 | Midhaul | Up | In Service | Green | 0 | 0 | 0 | N/A | N/A | N/A | N/A | SFP+-10G-CR | | | (")_(")~ |
| PE1 VLAN: 3048_DEDETP0001A-CS000-PE001 | Te0/0/0/18 | DELL iDRAC ESXi | Up | In Service | Green | 0 | 0 | 0 | N/A | N/A | N/A | N/A | SFP+-10G-CR | | | ------- |
| PE2 VLAN: 2048_DEDETP0001A-CS001-PE002 | TF0/0/0/24 | Fronthaul | Up | In Service | Green | 7.4 | -0.51 | -0.71 | N/A | N/A | N/A | N/A | SFP28-25G-SR | | | |> LIT FIBER |
| | | GNSS-receiver | --> | Phase Locked, Receiver Mode: Time fix only | | | | | | | | | | | | ------- |
| CSR Software | 7.3.2 | | | | | | | | | | | | | | | |
| SiteBoss Version | 2.12.480 | | | | | | | | | | | | | | | |
| SiteBoss Alarms | Active Alarms: Modbus Communication ST1, Modbus Communication ST2 | | | | | | | | | | | | | | | |

FIG. 4

CELL SITE ROUTER COMPREHENSIVE HEALTH CHECK

FIELD

A cell site includes a Cell Site Router (CSR) and a server. The server may be co-located with the server or may be deployed at a network operations center remote form the cell site. The present teachings perform a health check for the cell site. The teachings verify connectivity of the configured CSR ports and assesses a status of the server associated with the CSR. The verification may determine a server type and a server status. Additional checks may determine if the cell site should be provisioned, reprovisioned, instantiated or re-instantiated.

BACKGROUND

Cellular networks are highly complex. Historically, such as up to and including 4G Long Term Evolution (LTE) cellular networks, many cellular network components were implemented using specialized hardware. The advent of open radio access networks (O-RAN) and virtualization allows for the functionality of many cellular network components to be implemented as software executed on general-purpose hardware platforms. Since dozens or hundreds of different software components need to communicate and function in concert, and vary independently of the supporting hardware and infrastructure, in order for the cellular network to function, extensive testing of the cellular network is necessary.

In the prior art, health checks are performed by manually connecting to a cell site, executing various commands on components of the cell site and verifying outputs of the commands to ascertain correct configuration of the cell site By automating collecting of the outputs of the commands and verifying even a minimal operating capability, many man-hours can be saved.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In some aspects, the techniques described herein relate to a method for performing a health check for a cell site, the method includes: accessing a Cell Site Router (CSR) including vital interfaces at a cell site; gathering a respective value for each of the vital interfaces at the CSR; and generating a health report of the cell site based on gathered values, wherein the vital interfaces include one or more network ports and one or more radio unit interfaces, and the CSR is disposed at a base station.

In some aspects, the techniques described herein relate to a method, wherein the gathering includes setting the respective value to a portion of an output of a CSR command.

In some aspects, the techniques described herein relate to a method, further including indicating an error when the respective value is not within an operational range, wherein the gathering includes obtaining the operational range.

In some aspects, the techniques described herein relate to a method, wherein the obtaining includes parsing the output to obtain the operational range.

In some aspects, the techniques described herein relate to a method, wherein the obtaining includes obtaining the operational range from a table.

In some aspects, the techniques described herein relate to a method, further includes retrieving a CSR status from a site boss for the CSR, and the health report includes the CSR status.

In some aspects, the techniques described herein relate to a method, wherein the CSR status includes an alarm raised by the site boss.

In some aspects, the techniques described herein relate to a method, wherein the reporting includes integrating the CSR status and the health report.

In some aspects, the techniques described herein relate to a method, wherein color-coding the health report to indicate an error or an alarm.

In some aspects, the techniques described herein relate to a method, further including parallelizing the accessing, the gathering and the generating, wherein the cell site include a plurality of cell sites.

In some aspects, the techniques described herein relate to a system to perform a health check for a cell site, the method including: a Cell Site Router (CSR) including vital interfaces at a cell site; and a script to gathering a respective value for each of the vital interfaces at the CSR, and to generate a health report of the cell site based on gathered values, wherein the vital interfaces include one or more network ports and one or more radio unit interfaces, and the CSR is disposed at a base station.

In some aspects, the techniques described herein relate to a system, wherein the gathering includes setting the respective value to a portion of an output of a CSR command.

In some aspects, the techniques described herein relate to a system, wherein the script indicates an error when the respective value is not within an operational range, wherein the gathering includes obtaining the operational range.

In some aspects, the techniques described herein relate to a system, wherein the script parses the output to obtain the operational range.

In some aspects, the techniques described herein relate to a system, wherein the script obtains the operational range from a table.

In some aspects, the techniques described herein relate to a system, wherein the script retrieves a CSR status from a site boss for the CSR, and the health report includes the CSR status.

In some aspects, the techniques described herein relate to a system, wherein the CSR status includes an alarm raised by the site boss.

In some aspects, the techniques described herein relate to a system, wherein the script integrates the CSR status and the health report.

In some aspects, the techniques described herein relate to a system, wherein the script color-codes the health report to indicate an error or an alarm.

In some aspects, the techniques described herein relate to a system, wherein the script is parallelized with respect to the gather and the generate, wherein the cell site include a plurality of cell sites.

Additional features will be set forth in the description that follows, and in part will be apparent from the description, or may be learned by practice of what is described.

BRIEF DESCRIPTION OF THE DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 4 illustrates a CSR health check summary according to various embodiments.

Figure 1:
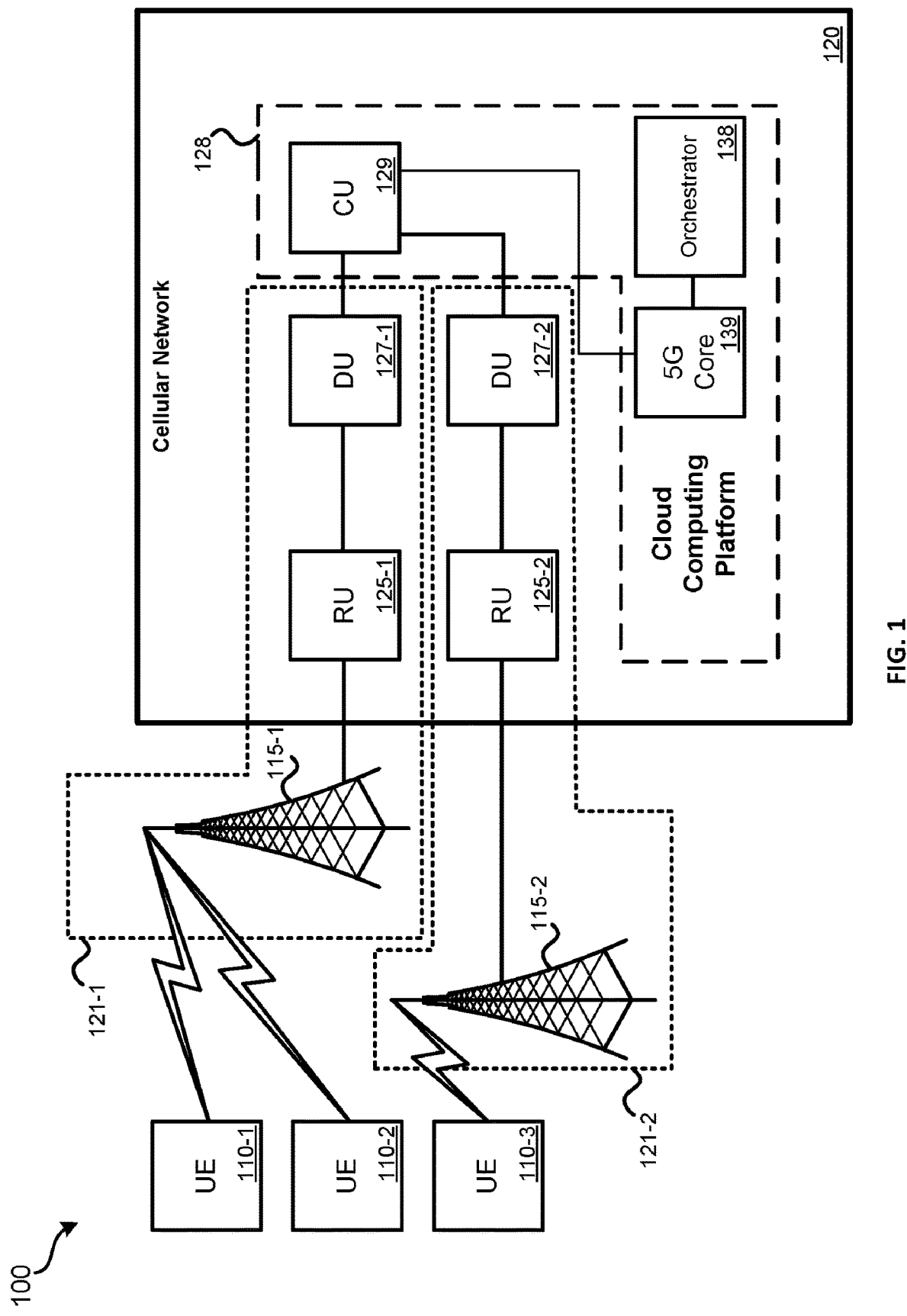
FIG. 1 illustrates an embodiment of a hybrid cloud cellular network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

FIG. 1 illustrates a block diagram of a hybrid cellular network system ("system 100"). System 100 can include a 5G New Radio (NR) cellular network; other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In an open radio access network (O-RAN), most components, except for components that need to receive and transmit RF, can be implemented as specialized software executed on general-purpose hardware or servers. For at least some components, the hardware may be maintained by a separate cloud-service computing platform provider. Therefore, the cellular network operator may operate some hardware (such as, RUs and local computing resources on which DUs are executed) connected with a cloud-computing platform on which other cellular network functions, such as the core and CUs are executed.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE 110 can represent any type of device that has an incorporated 5G interface, such as a 5G modem. Examples can include sensor devices, Internet of Things (IOT) devices, manufacturing robots, unmanned aerial (or land-based) vehicles, network-connected vehicles, or the like. Depending on the location of individual UEs, UE 110 may use RF to communicate with various BSs of cellular network 120. BS 121 may include an RU (e.g., RU 125-1) and a DU (e.g., DU 127-1). Two BSs 121 (BS 121-1 and BS 121-2) are illustrated. BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on a cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 can execute CU 129, 5G core 139, and orchestrator 138. The cloud-computing platform 128 can be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU for test, orchestrator 138 can perform a pipeline of calling the DU code from a software repository incorporated as part of, or separate from cellular network 120, pulling corresponding configuration files (e.g. helm charts), creating Kubernetes nodes/pods, loading DU containers, configuring the DU, and activating other support functions (e.g. Prometheus, instances/connections to test tools). While this instantiation of a DU may be triggered by orchestrator 138, a chaos test system may introduce false DU container images in the repo, may introduce latency or memory issues in Kubernetes, may vary traffic messaging, and/or create other "chaos" in order to conduct the test. That is, chaos test system is not only connected to a DU, but is connected to all the layers and systems above and below a DU, as an example.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The traditional OSS/BSS stack exists above orchestrator 138. Chaos testing of these components, as well as other higher layer custom-built components. Such components can be required sources of information and agents for testing at the service/app/solution layer. One aim of chaos testing is to verify the business intent (service level objectives (SLOs) and SLAs) of the solution. Therefore, if we commit to a SLA with certain key performance indicators (KPIs), chaos testing can allow measuring of whether those KPIs are being met and assess resiliency of the system across all layers to meeting them.

A cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
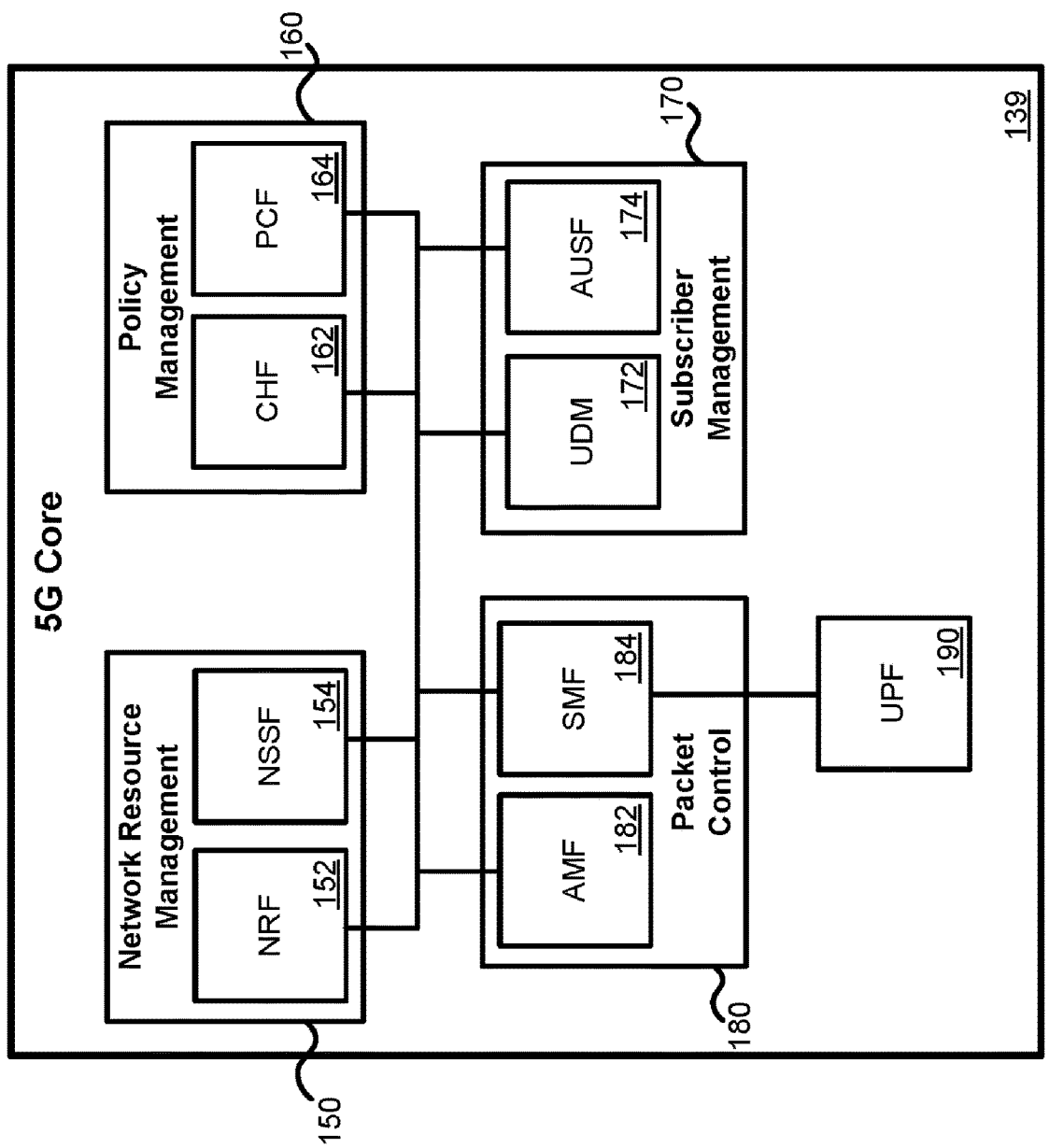
FIG. 2 illustrates an embodiment of a 5G Core.

FIG. 2 illustrates a block diagram of a cellular network core, which can represent 5G core 139. 5G core 139 can be implemented on a cloud-computing platform. 5G core 139 can be physically distributed across data centers, or located at a central national data center (NDC), and can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

The functions illustrated in FIG. 2 as part of 5G core 139 are merely exemplary. Many more or different functions may be implemented in the cellular network core and may vary by slice. The amount of computing resources devoted to a particular function can vary by slice.

Figure 3:
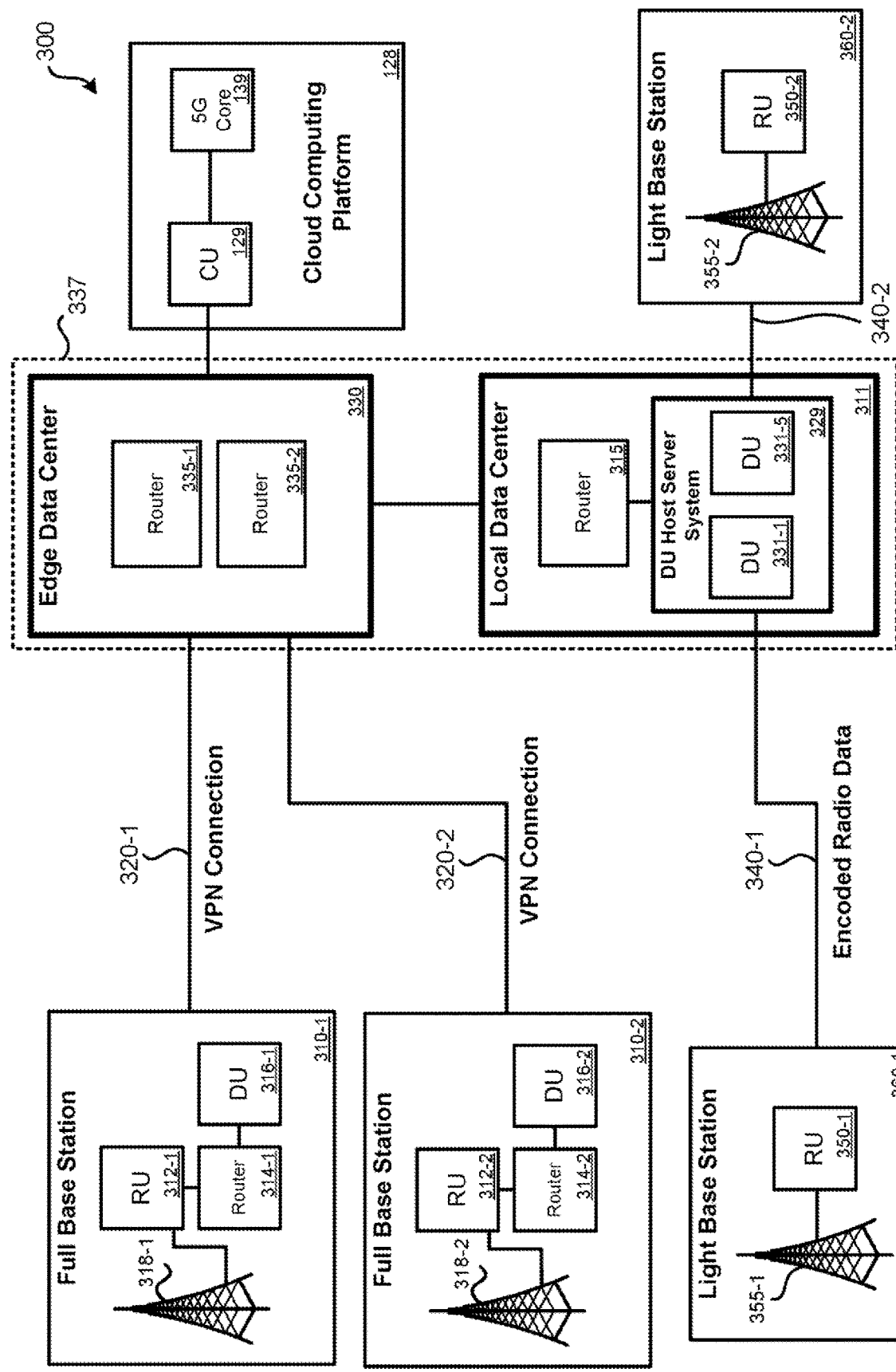
FIG. 3 illustrates an embodiment of a hybrid cloud cellular network architecture.

FIG. 3 illustrates an embodiment of hybrid cellular network system 300 ("system 300") that includes hybrid use of local and remote DUs in communication with a cloud computing platform that hosts the cellular network core. System 300 can include: LDC 311; light BSs 360; full BSs 310; VLAN connections 320; edge data center 330 ("EDC 230"); CU 129; and 5G core 139, which are executed on cloud computing platform 128. In system 300, some base stations, referred to as "full base stations," have DUs implemented locally at each BS. In contrast, a "light base station" includes structure (e.g., structures 355) and a local radio unit (e.g., RUs 350), but a DU implemented remotely at a geographically separated LDC. In system 300, either light BSs 360 or full BSs 310 may be referred to as a cell site.

LDC 311 can serve to host DU host server system 329, which can host multiple DUs 331 which are remote from corresponding light base stations 360. For example, DU 331-1 can perform the DU functionality for light base station 360-1. DUs with DU host server system 329 can communicate with each other as needed.

LDC 311 can be connected with EDC 330. In some embodiments, LDC 370 and EDC 330 may be co-located in a same data center or are relatively near each other, such as within 250 meters. EDC 330 can include multiple routers, such as routers 335, and can serve as a hub for multiple full BSs 310 and one or more LDCs 311. EDC 330 may be so named because it primarily handles the routing of data and does not host any RAN or cellular core functions. In a cloud-computing cellular network implementation at least some components, such as CU 129 and functions of 5G core 139, may be hosted on cloud computing platform 128. EDC 330 may serve as the past point over which the cellular network operator maintains physical control; higher-level functions of CU 129 and 5G core 139 can be executed in the cloud. In other embodiments, CU 129 and 5G core 139 may be hosted using hardware maintained by the cellular network provider, which may be in the same or a different data center from EDC 330.

Full BSs 310, which include on-site DUs 316, may connect with the cellular network through EDC 330. A full BS, such as full BS 310-1, can include: RU 312-1; router 314-1; DU 316-1; and structure 318-1. Router 314-1 may have a connection to a high bandwidth communication link with EDC 330. Router 314-1 may route data between DU 316-1 and EDC 330 and between DU 316-1 and RU 312-1. In some embodiments, RU 312-1 and one or more antennas are mounted to structure 318-1, while router 314-1 and DU 316-1 are housed at a base of structure 318-1. Full BS 310-2 functions similarly to full BS 310-1. While two full BSs 310 and two light BSs 360 are illustrated in FIG. 3, it should be understood that these numbers of BSs are merely for exemplary purposes; in other embodiments, the number of each type of BS may be greater or fewer.

While encoded radio data is transmitted via the fiber optic connections 340 between light BSs 360 and LDC 370, connection 320-1 between full BSs 310 and EDC 330 may occur over a fiber network. For example, while the connection between light BS 360-1 and LDC 370 can be understood as a dedicated point-to-point communication link on which addressing is not necessary, full BS 310-1 may operate on a fiber network on which addressing is required. Multiprotocol label switching (MPLS) segment routing (SR) may be used to perform routing over a network (e.g., fiber optic network) between full BS 310-1 and EDC 330. Such segment routing can allow for network nodes to steer packetized data based on a list of instructions carried in the packet header. This arrangement allows for the source from where the packet originated to define a route through one or more nodes that will be taken to cause the packet to arrive at its destination. Use of SR can help ensure network performance guarantees and can allow for network resources to be efficiently used. Other full BSs may use the same types of communication link as full BS 310-1. While MPLS SR can be used for the network connection between full BSs 310 and EDC 330, it should be understood that other protocols and non-fiber-based networks can be used for connections 320.

For communications across connection 320-1, a virtual local area network (VLAN) may be established between DU 316-1 and EDC 330, when a fiber network that may also be used by other entities is used. The encryption of this VLAN helps ensure the security of the data transmitted over the fiber network.

Since light BSs 360 are relatively close to LDC 370, typically in a dense urban environment, use of a dedicated point-to-point fiber connection can be relatively straightforward to install or obtain (e.g., from a network provider that has available dark fiber or fiber on which bandwidth can be reserved). However, in a less dense environment, where full BSs 310 can be used, a point-to-point fiber connection may be cost-prohibitive or otherwise unavailable. As such, the fiber network on which MPLS SR is performed and the VLAN connection is established can be used instead. Further, the total amount of upstream and/or downstream data from a light BS to an LDC may be significantly greater than the amount of upstream and/or downstream data from a DU of a full BS to EDC 337, thus requiring a dedicated fiber optic connection to satisfy the bandwidth requirements of light BSs.

To perform chaos testing, a small portion of the cellular network can be simulated and tested, followed by larger portions of the cellular network as needed to verify functionality and robustness. Once satisfied as to performance in a test environment, testing can be performed in a restricted production environment, followed by release into the general production environment. On each of these levels, some amount of chaos testing can be performed.

Health Checks

A CSR heath check summary 400 may report cell site status. Down ports may be color-coded as red (not shown). This can readily identify components of the cell site that are operating correctly or incorrectly. When all components are operational, the CSR health check may indicate that an overall status of the tested cell site as operational. Success and failures may be color-coded. For example, a success may be color-coded with a green background while a failure is color-coded with a red background. The CSR Health Check may determine if a site is ready for reprovisioning, after it has been re-instantiated (for whatever reason). In some embodiments, the CSR health check may gather additional information. For example, network addresses for the configured ports and their respective port names may be retrieved from the CSR. Exemplary ports for which network addresses and network ports may be gathered include a Management-PLANE IPv4 port, a BMC (Server) port, an ESXi IPv4 port, a short haul port, a mid-haul port or the like.

FIG. 4 illustrates a CSR health check summary according to various embodiments. The CSR health check may identify parameters such as:

Site ID: This lists the canonical name for the cell site and an interface data definition. In some embodiments, the Site ID column may include a cell Site Identifier, a serial number of the Cell Site Router, a sector of the CSR (for example, Alpha/Beta/Gamma), =a Provider Edge Router Identifier (for example, PE1/PE2), a CSR firmware and software version, a SiteBoss Version and any active alarms on the SiteBoss.

Interface/port name: These are mostly the interfaces (ports) for each corresponding item to the left. It basically says where each item is located (for example, Alpha TMB is Te0/0/0/4, which means it's on Port #4. The final number (0/0/0/#) indicates which port that interface uses).

Description: These are the Interface Data Descriptions of the Definitions outlined above. These briefly describe what the corresponding interfaces are used for. For example, Midhaul is where the F1 Interface is used to connect the gNode-B CU to a gNode_B DU. Other descriptions include SiteBoss, BMS, SM BMC ESKi, RJ1, RJ2, DU PTP, VMware MGMT, Midhaul, Dell IDRAC ESKi, Fronthaul, GNSS receiver or the like.

Port Status: The port status states of the interfaces being checked. A healthy and in-use interface will be "Up" and "In Service".

Admin State: The administrative states of the interfaces being checked. A healthy and in-use administrate state will be "Up" and "In Service", "phase locked," or the like.

LED state: color value of an LED on the physical device, for example, Not applicable, red, green, orange and the like. In some embodiments, shows the color of the LED Optical Links for their corresponding interfaces.

Laser Bias (mA): Measurement of the Laser Bias, when valid. This, simply put, is a measure of strength of the laser beam used in a router. A higher value means the beam is stronger and will be more visible and intense. The laser bias may be relevant for fiber network ports and may be color-coded to indicate operation within acceptable ranges.

Tx Power (dBm) or Tx Power (mW): Tx Power measures the amount of power a device uses to transmit a signal to another device. This may be relevant for radio units and may be color-coded to indicate operation within acceptable ranges.

Rx Power (dBm) or Rx Power (mW): Rx Power measures the amount of power a device uses to receive a signal from another device. This may be relevant for radio units and may be color-coded to indicate operation within acceptable ranges.

TRX Temp (° C.): Temperature in Celsius of transceivers or radio units and may be color-coded to indicate operation within acceptable ranges.

TRX Voltage (V): Operating voltage in Volts for transceivers or radio units and may be color-coded to indicate operation within acceptable ranges TRX Type: Mode/part number of transceivers or radio units.

MAC Address: MAC address of the server, SiteBoss, and radio units (RUs) and may be color-coded.

IP Address: IP address of the server, SiteBoss, and radio units (RUs) and may be color-coded.

Device Type: Miscellaneous information such as a server type, for example, a Dell server, a Supermicro server, or the like; or a SiteBoss type, for example, Ascentria SiteBoss. This may also indicate whether the site is a Lit Fiber Site or a Dark Fiber Site.

FIG. 4 is an exemplary summary of a test run. The summary data may be used for further evaluation of potential site issues and for resolving those issues. The summary provides comprehensive data points collected by the health check. The individual data point collected can verify operability of a radio unit, a physical state of various service units connected to the CSR, availability of various management and administrative services, and the like. Every displayed value can be potential problem areas for a 5G site. For example, having a high Tx Power reading can mean your router may overheat, consume more power, interfere with other devices, or the like. This may result in service disruptions or data loss. Another issue may be a CSR or server not "learning" a MAC Address. When the present teachings are unable to learn an interface device's MAC Address from the CSR, then there's a high likelihood of a hardware fault, The hardware fault may be something as simple as a hardware component being disconnected.

The present teachings are more comprehensive as they retrieve parameter readings, such as the Tx Power and Rx Power, the types of transceiver modules, the serial number of the CSR, the GNSS-receiver status, as well as any applicable SiteBoss software version and alarm data.

Tx/Rx Power readings may determine the active status of the power levels. Transceiver model numbers may allow for determination of whether or not correct Small Factor Pluggable (SFP) Modules have been installed to a corresponding port. When a port should be UP but is listed as not UP, an incorrect SFP may be installed. Moreover, when an interface related parameter is out of the associated parameter range, the interface may be failing or may fail imminently. The correct connections between the various CSR interfaces lends to the overall health determination of the O-RAN interfaces. As such, O-RAN issues are easily identifiable and greatly streamline the entire process of checking the CSR and SiteBoss of a site, and effectively the whole 5G network.

The Global Navigation Satellite System receiver (GNSS-receiver) status may determine the location, velocity, and time of a user by receiving signals from GNSS satellites. Data from the GNSS may be used for mapping and accurate surveying. Data from the GNSS may be used for navigation, timing, and synchronization.

Data from a SiteBoss, such as the active alarms may identify potential problem areas at the site as a whole, such as cabinet batteries not being installed (which puts us at risk of outage, if commercial power is lost). The present teachings access a SiteBoss via a Command Line Interface (CLI) to provide freedom and flexibility when retrieving data from a SiteBoss. The prior art fails to log into the SiteBoss and automate collection of SiteBoss data, such as, a site alarm. The color coding helps a great deal, and not just for the SiteBoss, but everywhere else, as well, as you can know of any issues at the site within seconds of opening the health check's output document.

In an O-RAN environment, the present teachings provide an ease of operational capability and environment. The testing of a plurality can be performed serially or in parallel at a faster rate, With the speed at which the tests are carried out, along with the color coding, a field engineer can review the CSR health report and identify issues at the site. The field engineer may receive the CSR health report electronically, and/or may initiate the cell site testing. The present teachings improve the overall sustainability of the network, speed up troubleshooting issues and performing a remedy to alleviate the issues. With regards to FIG. 4, the CSR health report includes O-RAN data that informs about the interfaces in use, such as, the Radio Unit, BMC/iDRAC, Midhaul, VMware Management, and ESXi Host Management interfaces.

Figure 5:
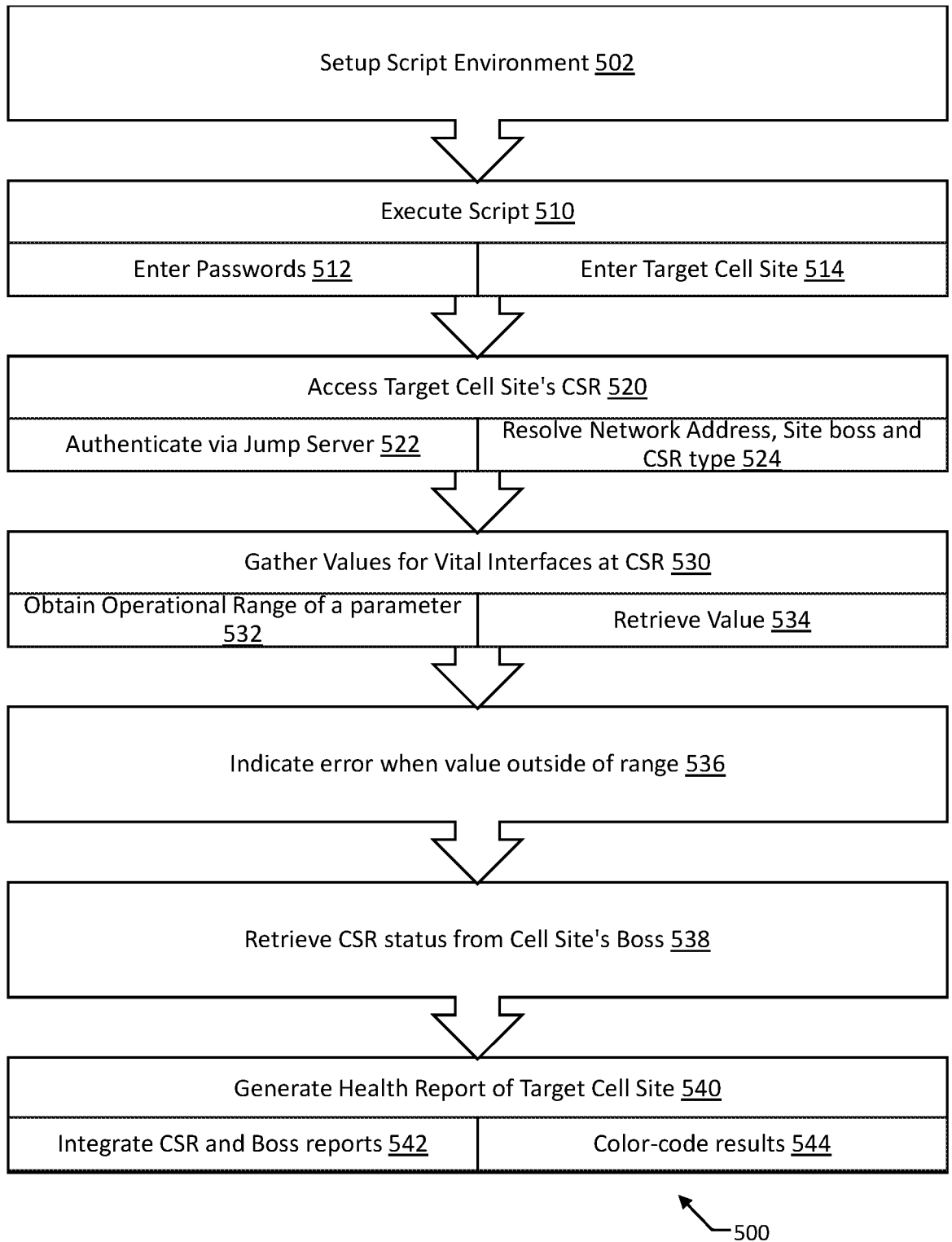
FIG. 5 illustrates an embodiment of a method for performing a cell site health check.

FIG. 5 illustrates an embodiment of a method for performing a cell site health check.

In some embodiments, a method 500 for performing a cell site health check may include an operation 502 to setup a script environment, for example, by setting up Python on a console. Operation 502 may be performed once per console. Operation 502 may include periodically updating Python or the like.

The method 500 may include an operation 510 to execute the script, for example, by double-clicking on the script "CSR Health Check Multi-Tool.exe". Operation 510 may include an operation 512 to enter a password and operation 514 to enter target cell site IDs. In operation 514, the target cell site IDs may be entered per line and/or as a file listing the target cell site IDs. In some embodiments, the target cell site IDs may identify a CSR at a base station. CSRs disposed at a location other than a base station may be tested via other means. For example, after your password has been inserted, a blank text document may be populated with the site IDs of the target CSRs, preferably, one site ID per row. After the document is saved and closed, the script may log into a jump server, and then simultaneously log into each target CSR. In some embodiments, the script may be threaded and operations for each of the target cell sites (described below) may be performed in parallel or concurrently.

The method 500 may include an operation 520 to access each target cell site's CSR. Operation 520 may include an operation 522 to authenticate to a respective cell site CSR, for example, via a jump server. Operation 520 may include an operation 524 to resolve a network address to connect to a target site, a site boss to retrieve the target CSR's status per the site boss, and a CSR type to identify the vital interfaces of each target cell site. In some embodiments, the CSR type may be hard coded, for example, a CISCO CSR. In some embodiments, the vital interfaces may be hard coded for the CSR type. In some embodiments, the site boss may be hard coded. In some embodiments, the jump server may be responsible for completing operation 524. In some embodiments, the jump server may be replaced by a different identification and authentication methodology.

The method 500 may include an operation 530 to gather values for vital interfaces of the CSR. Operation 530 may begin by collecting current values by capturing an output of commands executed on the CSR. The output may be saved in a log directory. The output may be parsed to obtain the value of a parameter of interest. Exemplary parameters may be relevant to a particular vital interface type. For example, a laser bias parameter may be relevant to a fiber network port, while a Rx power or Tx power parameter may be relevant to a radio unit. Parameters may include one or more of an operational status, operating temperature, operating voltage, operating current, operating bias and the like. In some embodiments, operation 530 may take approximately 4-5 minutes to fully execute. In some embodiments, the operation 530 can be simultaneously performed for multiple cell sites; in other words, performed in parallel so that values for a plurality of cell sites are gathered at the same time. In some embodiments, values for up to 15 cell sites may be gathered at the same time.

Operation 530 may include operation 532 to obtain operational ranges of some of the vital interfaces, for example, Laser Bias (mA), Transmission (Tx) Power in dBm, Reception (Rx) Power in dBm, Tx Power in mW, Rx Power in mW, Transceiver (TRX) Temperature, TRX Voltage and the like. In some embodiments, the operational ranges may be parsed from the CSR output. In some embodiments, the operational ranges may be hard coded into the script for use with operation 536 and operation 544 (see below). The operational ranges may be defined by a manufacturer of the CSR to ensure proper functionality and overall health of the CSR. The vital interfaces, their operational ranges and thresholds may be found in documentation and saved in a convenient format, such as a table or list.

Operation 530 may include operation 534 to retrieve a status/value of one or more of the vital interfaces. Some CSRs may output such data with a command. For example, a CISCO Cell Site Router may output such information with a command "show controller <port name>", for example, "show controller tengige0/0/0/4". The status/values retrieved for the necessary interfaces may be verified against the corresponding ranges retrieved in operation 532 to determine operational status of the interface.

Operation 530 may include operation 536 to indicate an error when a status/value is outside the operational range. For a numerical value of a parameter, outside the may be determined by the current value being greater than or less than the associated operational range. For a non-numerical value of a parameter, the outside may be determined by the current value being different than a set of pre-defined acceptable strings.

Method 500 may include operation 538 to retrieve the CSR status per the target Cell Site's Boss. For example, after the checks have completed with the CSR, a script may log into the Cell Site's SiteBoss to retrieve the overall health at the Cell Site's location. Operation 538 may retrieve alarms noted by the SiteBoss.

The method 500 may include an operation 540 to report health of the target cell site. The operation 540 may include an operation 542 to integrate the CSR and SiteBoss reports. The operation 540 may include an operation 544 to color-code the results.

In one embodiment, once a script completes its execution, an output directory may open and reveal the output files. The output files may be color-coded spreadsheets, for example, .xlsx workbooks. The color-coding streamlines identifying observed issues of the cell site and the cell site boss. Exemplary identifications from the output files may include:

MAC Learning of various connected interfaces is happening for a SiteBoss from the CSR, for example, the Asentria SiteBoss.

MAC Learning is happening for the server, for example, a Dell XR11.

IP and MAC Addresses of the CSR and the SiteBoss.

Site ID and Serial Number for the CSR.

Firmware and Software versions of the CSR and SiteBoss, and alerts when there are issues.

A PE Router Description.

Exact names of each sector supported by the RUs of the cell site may be translated along with their current port status, administrative state, LED state, Laser Bias (mA), Transmit Power and Receive Power (dBm), Transmit Power and Receive Power (mW), Temperatures and Voltages of the Transceiver Modules, which Transceiver Module types are being used, and the IP and MAC Addresses of the RUs using them.

Checks non-RU interfaces of the cell site, such as the Precision Time Protocol (PTP) interface, VMware Management interface, Midhaul interface, ESXi Host Management (whether Dell or Supermicro) interface, Fronthaul interface, and the GNSS Receiver interface.

Reports that the cell site is a Dark Fiber or Lit Fiber site.

Reports any detected alarms on the SiteBoss.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

I claim:

1. A computer-implemented method for performing a health check for a cell site, the method comprising:
   accessing a Cell Site Router (CSR) comprising vital interfaces at a cell site;
   gathering a respective value for each of the vital interfaces at the CSR;
   indicating an error when the respective value is not within a respective operational range of the respective one of the vital interfaces; and
   generating a health report of the cell site based on gathered values,
   wherein the vital interfaces comprise one or more network ports and one or more radio unit interfaces, and the CSR is disposed at a base station,
   wherein the gathering comprises setting the respective value to a portion of a textual output of a first CSR command and setting the respective operational range to a portion of a textual output of a second CSR command,
   wherein the respective operational range is set dynamically, and
   wherein the respective operational range comprises ranges for one or more of a Laser Bias (mA), a Transmission (Tx) Power in dBm, a Reception (Rx) Power in dBm, a Tx Power in mW, a Rx Power in mW, a Transceiver (TRX) Temperature, or a TRX Voltage.

2. The method of claim 1, further comprises retrieving a CSR status from a site boss for the CSR, and the health report comprises the CSR status.

3. The method of claim 2, wherein the CSR status includes an alarm raised by the site boss.

4. The method of claim 2, wherein the reporting comprises integrating the CSR status and the health report.

5. The method of claim 1, wherein color-coding the health report to indicate an error or an alarm.

6. The method of claim 1, further comprising parallelizing the accessing, the gathering and the generating, wherein the cell site comprise a plurality of cell sites.

7. A system to perform a health check for a cell site, the system comprising:
   a Cell Site Router (CSR) comprising a processor and vital interfaces at a cell site; and
   a script to gather a respective value for each of the vital interfaces at the CSR, to indicate an error when the respective value is not within a respective operational range of the respective one of the vital interfaces, and to generate a health report of the cell site based on gathered values,
   wherein the vital interfaces comprise one or more network ports and one or more radio unit interfaces, and the CSR is disposed at a base station,
   wherein to gather comprises to set the respective value to a portion of a textual output of a first CSR command and to set the respective operational range to a portion of a textual output of a second CSR command,
   wherein the respective operational range is set dynamically, and
   wherein the respective operational range comprises ranges for one or more of a Laser Bias (mA), a Transmission (Tx) Power in dBm, a Reception (Rx) Power in dBm, a Tx Power in mW, a Rx Power in mW, a Transceiver (TRX) Temperature, or a TRX Voltage.

8. The system of claim 7, wherein the script retrieves a CSR status from a site boss for the CSR, and the health report comprises the CSR status.

9. The system of claim 8, wherein the CSR status includes an alarm raised by the site boss.

10. The system of claim 8, wherein the script integrates the CSR status and the health report.

11. The system of claim 7, wherein the script color-codes the health report to indicate an error or an alarm.

12. The system of claim 7, wherein the script is parallelized with respect to the gather and the generate, wherein the cell site comprise a plurality of cell sites.

* * * * *